Patented Aug. 10, 1937

2,089,302

UNITED STATES PATENT OFFICE

2,089,302

RUBBER COMPOSITION AND METHOD OF PRESERVING RUBBER

Waldo L. Semon, Cuyahoga Falls, and Arthur W. Sloan, Akron, Ohio, assignors to The B. F. Goodrich Company, New York, N. Y., a corporation of New York No Drawing. Application August 21, 1931, Serial No. 558,558

14 Claims. (Cl. 18—50)

This invention relates to the art of preserving rubber, either in the vulcanized or unvulcanized condition, and to rubber compositions so preserved.

It is well known that rubber gradually loses its strength and resiliency, particularly when exposed to light, heat, and air, such deterioration being commonly attributed to an oxidation of the rubber or the rubber composition. Various substances, known generally as age-resisters or anti-oxidants, have heretofore been added to rubber for the purpose of retarding its deterioration. The use of these previously known substances has been attended by various disadvantages, including discoloration of the rubber, foul odor, toxicity, poor miscibility with rubber, necessity of employing inconveniently high proportions to obtain an appreciable effect, high cost, and necessity of changing vulcanizing conditions.

It is an object of this invention to provide a new and exceedingly effective class of age-resisters for rubber and other like organic substances such as oils. A further object is to provide age-resisters free at least in a substantial measure from the disadvantages noted above. Another object is to provide age-resisters which possess the property of inhibiting fatigue failure or cracking due to repeated flexing of the rubber. Other objects will be apparent from the following description of the invention.

This invention, in brief, consists in treating rubber with a member of a class of substances which may be characterized as reaction products of a quinone with an aromatic amine. In a preferred embodiment the invention consists in incorporating the age-resister in an unvulcanized rubber composition, preferably in the proportion of from one-tenth to four per cent of the rubber content of the composition, and then vulcanizing it in the usual manner.

The reaction products of the quinones and the aromatic amines may be prepared in any one of numerous different ways, the properties of the reaction product being to some extent dependent on the proportions of the reagents and on the conditions under which they are reacted. However, it appears to be essential that the reaction between the quinone and the aromatic amine takes place with the elimination of water. One or more of the usual condensation catalysts, including hydrochloric or sulphuric acid, iodine, zinc chloride, calcium chloride, copper salts, etc., may be added if desired, but are not required in every case.

The quinones which may be employed in preparing these reaction products include quinone, naphthoquinone, anthraquinone, aurine, as well as addition products of these quinones with phenols, such as quinhydrone, phenoquinone, etc.

The aromatic amine which is reacted with the quinone may be a primary aromatic amine such as aniline, the toluidines and xylidines, cumidine, anisidine, phenetidine, amino biphenyl, amino diphenyl ether, alpha or beta naphthylamine, amino acenaphthene, etc., or a secondary aromatic amine such as methyl aniline, ethyl aniline, propyl aniline, methyl naphthylamine, cyclohexyl naphthylamine, diphenylamine, phenyl-toluidine, ditolylamine, phenyl naphthylamine, dinaphthylamine, alpha indanyl p-toluidine, phenylamino biphenyl, etc., or a tertiary amine such as dimethyl aniline, diethyl aniline, dimethyl alpha naphthylamine, etc., or a secondary aromatic diamine such as methylene dianilide, diphenyl ethylene diamine, diphenyl p-phenylene diamine, di beta-naphthyl p-phenylene diamine, diphenyl benzidine, bibenzyl, p-phenylene diamine, p, p' dinaphthylamino diphenyl methane, p, p' dinaphthylamino diphenyl dimethyl methane, phenyl p-amino benzyl aniline, etc., or aromatic substances containing one primary amino group together with a secondary or tertiary amino group, such as p-amino diphenylamine, p-amino benzyl aniline, methyl p-phenylene diamine, beta naphthyl p-phenylene diamine, phenyl benzidine, p-amino p' naphthylamino diphenyl methane, p-amino dimethylaniline, etc.

Any one of the above-mentioned quinones may be reacted with any one of the enumerated aromatic amines, either in equimolecular or in other proportions; or mixtures of two or more quinones or amines may be employed, being introduced into the reaction either concurrently or successively; or other members of the classes outlined above than those specifically mentioned may be substituted therefor. However, it appears to be essential that the reactive groupings in the two components be the carbonyl and the amino groups respectively, for substances containing reactive groups such as nitroso groups, carboxyl groups, sulphonic acid groups, nitrile groups and even hydroxy or carbonyl groups in the case of the aromatic amines do not undergo the characteristic reactions of the quinones and amines and hence do not give rise to products useful in this invention. On the other hand, such comparatively inactive substituent groups as ether groups, hydroxyl groups in the quinones, and of course the hydrocarbon groups, do not affect the nature and course of the reaction appreciably. It is to be understood therefore that the terms "quinone" and "amine" are hereinafter employed to refer only to substances whose properties are determined by the presence of the carbonyl and amino groupings respectively, and not to substance whose properties are essentially altered by the presence of other active groupings.

Amines containing two primary amino groups attached to a single aromatic nucleus, such as phenylene and naphthylene diamines, have not given as good results as those enumerated above, but give reaction products with quinones showing a markedly low degree of activity and comparatively limited usefulness in this invention.

The nature and mechanism of the reaction occurring between quinones and aromatic amines is not well understood. Under most conditions the reaction product is rather a complex mixture of different types of organic compounds of varying molecular weight and degree of complexity. They all are essentially nitrogenous bases and are all substantially free from oxygen, inasmuch as the condensation with the elimination of water is typical of the reaction between quinones and aromatic amines. It is not ordinarily necessary to separate the individual components of the product, since they are all apparently endowed with useful properties for the purpose of this invention, and the crude reaction mixture exhibits certain distinct advantages over pure, crystalline chemicals, notably in its ease of incorporation into rubber, and comparative freedom from blooming. Nevertheless, the components of the product may be separated and individually employed in the process of this invention if it is desired.

The reaction products of quinones and aromatic amines described above have little or no effect on the vulcanization of rubber, and can hence be added to existing rubber compositions without appreciably affecting their rate of vulcanization. They may be used in conjunction with any of the usual vulcanizing agents or accelerators of vulcanization.

As a specific example of one embodiment of this invention, one molecular proportion of quinone was refluxed with two molecular proportions of aniline. The product was an excellent age-resister.

One molecular proportion of aurine was reacted with two molecular proportions of alpha naphthylamine. The product was likewise an excellent age-resister.

A typical tire tread composition contains blended plantation rubbers 100 parts by weight, sulphur 5.5 parts, zinc oxide 30 parts, gas black 40 parts, mineral rubber 10 parts, palm oil 5 parts, and hexamethylene tetramine 0.75 part. If 0.95 part (0.5% of the composition) of either of the above products is added and the composition vulcanized in a press for 45 minutes at 294° F. to produce an optimum cure, the composition deteriorates far less rapidly than the same composition without the age-resister. Other products within the scope of this invention will give like results.

Although a single specific rubber composition has been given above for illustrative purposes, it will be evident that this invention is applicable to rubber compositions of the most varied nature, and that all manner of rubber goods, including pneumatic and solid rubber tires, tubes, hose, belting, packing, boots and shoes, surgical rubber goods, seamless dipped rubber articles, etc. may have their useful life greatly prolonged by the practice of this invention. The reaction products of quinones and aromatic amines may also be applied to the surface of unvulcanized or vulcanized rubber, for example in the form of a paste, powder or liquid, with good effect on its age-resisting properties.

It is to be understood that the term "treating" as employed in the appended claims is used in a generic sense to include either the incorporation of the condensation products of quinones and aromatic amines into the rubber by milling or similar process, or by mixing with the rubber latex before coagulation, or to the application thereof to the surface of crude or vulcanized rubber. The term "rubber" is likewise employed in the claims in a generic sense to include caoutchouc, balata, gutta percha, rubber isomers and like products, whether or not admixed with fillers, pigments, vulcanizing or accelerating agents.

While we have herein disclosed with considerable particularity certain preferred manners of performing our invention, we do not thereby desire or intend to limit ourselves solely thereto, for, as hitherto stated, the precise proportions of the materials utilized may be varied and other materials having equivalent chemical properties may be employed if desired without departing from the spirit and scope of the invention as defined in the appended claims.

We claim:

1. The method of preserving rubber which comprises treating rubber with the reaction product of quinone and aniline.

2. A composition of matter comprising rubber and the reaction product of quinone and aniline.

3. The method of preserving rubber which comprises treating rubber with the reaction product of quinhydrone and aniline.

4. The method of preserving rubber which comprises treating rubber with the reaction product of aurine with aniline.

5. A composition of matter comprising rubber and the reaction product of quinhydrone with aniline.

6. A composition of matter comprising rubber and the reaction product of aurine and aniline.

7. The method of preserving rubber which comprises treating rubber with the reaction product of a quinone which contains no substituent group more reactive toward aromatic amines than the carbonyl group and an aromatic amine which contains no substituent group more reactive toward quinones than the amino group.

8. The method of preserving rubber which comprises treating rubber with the reaction product of a quinone which contains no substituent group more reactive toward aromatic amines than the carbonyl group and a primary aromatic mono-amine consisting solely of the elements carbon, hydrogen and nitrogen.

9. A composition of matter comprising rubber and the reaction product of a quinone which contains no substituent group more reactive toward aromatic amines than the carbonyl group and an aromatic amine which contains no substituent group more reactive toward quinones than the amino group.

10. A composition of matter comprising rubber and the reaction product of a quinone which contains no substituent group more reactive toward aromatic amines than the carbonyl group and a primary aromatic mono-amine consisting solely of the elements carbon, hydrogen and nitrogen.

11. The method of preserving rubber which comprises treating rubber with the reaction product of an aromatic amine which contains no substituent group more reactive toward quinones than the amino group and the addition product of a quinone and a phenol neither of which contains any substituent group more reactive toward aromatic amines than the carbonyl group.

12. The method of preserving rubber which comprises treating rubber with the reaction product of quinhydrone and a primary aromatic mono-amine consisting solely of the elements carbon, hydrogen and nitrogen.

13. A composition of matter comprising rubber and the reaction product of an aromatic amine which contains no substituent group more reactive toward quinones than the amino group and the addition product of a quinone and a phenol neither of which contains any substituent group more reactive toward aromatic amines than the carbonyl group.

14. A composition of matter comprising rubber and the reaction product of hydroquinone and a primary aromatic mono-amine consisting solely of the elements carbon, hydrogen and nitrogen.

WALDO L. SEMON.
ARTHUR W. SLOAN.